United States Patent [19]
Bernhardt

[11] Patent Number: 5,346,330
[45] Date of Patent: Sep. 13, 1994

[54] METHOD OF YIELDING OIL RESIDUES OR OIL CONTAINING LIQUIDS FROM CONTAMINATED GROUND LAYERS

[75] Inventor: Bruno Bernhardt, Reutlingen, Fed. Rep. of Germany

[73] Assignee: IEG Industrie-Engineering GmbH, Betzingen, Fed. Rep. of Germany

[21] Appl. No.: 63,991

[22] Filed: May 19, 1993

[30] Foreign Application Priority Data

May 23, 1992 [DE] Fed. Rep. of Germany ....... 4217184

[51] Int. Cl.$^5$ .......................... E02B 15/08; B09B 3/00
[52] U.S. Cl. .................... 405/128; 210/747; 405/52; 405/58
[58] Field of Search ............... 405/128, 129, 258, 52; 210/747, 751; 166/275, 305.1, 308

[56] References Cited

U.S. PATENT DOCUMENTS

| | | | |
|---|---|---|---|
| Re. 33,102 | 10/1989 | Visser et al. | |
| 3,476,186 | 11/1969 | Sarem | 166/275 X |
| 3,490,534 | 1/1970 | Grady | 166/275 X |
| 3,500,917 | 3/1970 | Lehner et al. | 166/275 X |
| 3,754,598 | 8/1973 | Holloway | 166/275 X |
| 4,982,788 | 1/1991 | Donnelly | |
| 5,061,119 | 10/1991 | Balthaus et al. | 405/128 |
| 5,076,727 | 12/1991 | Johnson et al. | 405/128 |
| 5,120,160 | 6/1992 | Schwengel | 405/128 |
| 5,161,914 | 11/1992 | Rahn et al. | 405/128 |
| 5,178,491 | 1/1993 | Graves et al. | 405/128 |

FOREIGN PATENT DOCUMENTS

| | | |
|---|---|---|
| 0413947 | 2/1991 | European Pat. Off. |
| 3300686 | 7/1984 | Fed. Rep. of Germany |
| 3739126 | 6/1989 | Fed. Rep. of Germany |
| 3908171 | 9/1990 | Fed. Rep. of Germany |
| 1021607 | 3/1966 | United Kingdom |

OTHER PUBLICATIONS

Wasser, Luft Und Boden, vol. 33, No. 4, Apr. 1989, Ripper, et al., "Umweltschadensfall Pintsch-öl Hanau: Erste Sanierungsschritte eingeleitet", pp. 60–63.
PT Civiele Techniek, vol. 39, No. 1, 1984, Heinis, et al., "Bodemsanerings-technieken/1 Verwijdering van bodemverontreiniging", pp. 7–15.

*Primary Examiner*—Dennis L. Taylor
*Attorney, Agent, or Firm*—Michael J. Striker

[57] ABSTRACT

A method of yielding oil residues or oil containing liquids from contaminated ground layers, includes forming at least two adjacent bore holes in a contaminated ground region, producing connecting passages between the bore holes by loosening and partially rinsing out components of a ground material which surrounds the bore holes and directing a liquid in at least one of the bore holes; applying an underpressure in at least one of the bore holes for aspirating the liquid upwardly, supplying a fluid in at least another one of the bore hole with maintaining a pressure difference between the bore holes, and aspirating in the bore hole under pressure oil separated from the liquid in a raised liquid column or an oil containing cover layer of the liquid column.

10 Claims, 1 Drawing Sheet

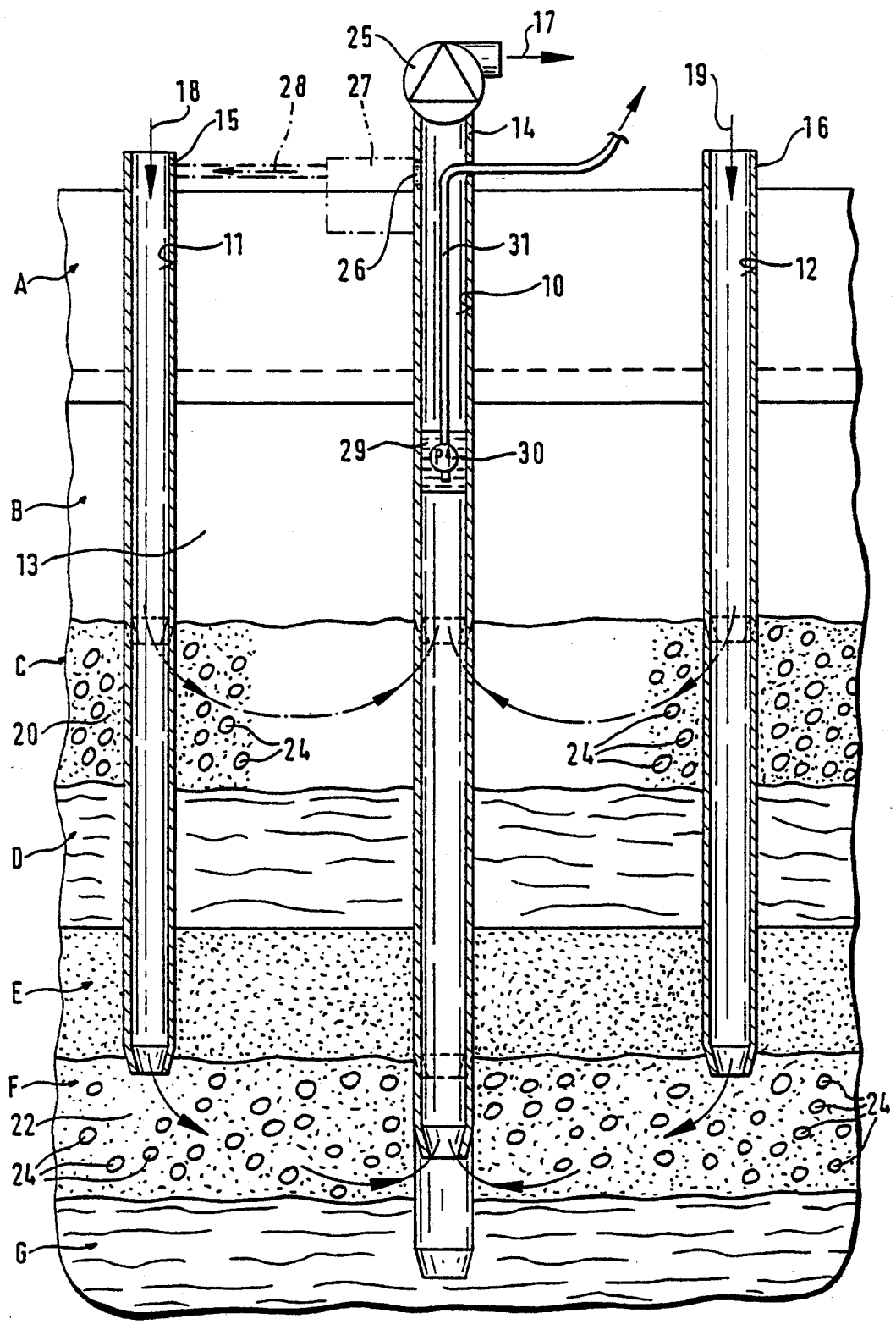

METHOD OF YIELDING OIL RESIDUES OR OIL CONTAINING LIQUIDS FROM CONTAMINATED GROUND LAYERS

BACKGROUND OF THE INVENTION

The present invention relates to a method of yielding oil residues of oil containing liquids from contaminated ground regions.

It is in general known to fill depleted oil deposits with a rinsing fluid, then pump the rinsing fluid with entrained oil residues and then separate the oil residues from the rinsing fluid. For sanitation of the ground layer contaminated with oil these methods cannot be simply taken over, and first of all when the region to be cleaned is located in inhabited areas or the agriculturally intensively utilized regions. In these situations the change in the ground water level which is unavoidable during the use of this well-known method must be avoided.

SUMMARY OF THE INVENTION

Accordingly, it is an object of the present invention to provide a method of yielding oil residues or oil containing liquids from contaminated ground regions, which avoid the disadvantages of the prior art.

More particularly, it is an object of the present invention to provide a method of yielding oil residues by means of a carrier liquid so that no undesirable influence of the environment occurs.

In keeping with these objects and with others which will become apparent hereinafter, one feature of the present invention recites briefly stated, in a method which includes the following steps:

- driving down at least two adjacent bore holes in the contaminated ground layer, and for forming connection passages between the individual bore holes loosening and at least partially rinsing components of the ground material which surrounds the bore hole ends by pumping and/or aspirating a liquid in and out of at least one of the bore holes;

- producing an underpressure in at least one of the bore holes by aspirating the liquid, and post-supplying the rinsing liquid or air in at least another of the bore holes with maintaining a pressure difference between both bore holes;

- aspirating oil or an oil containing cover layer of the liquid column separated from the liquid in the liquid column in the bore hole located under the underpressure, by means of a liquid heat pump.

When the first step of the inventive method is performed, connecting channels between the individual bore holes are provided at least so that during the underpressure generation in one bore hole in accordance with the second mentioned step a pressure difference is produced in the other bore hole, which forces the liquid movement at least between the bore holes. Therefore, either the ground water and/or rinsing liquid introduced into the bore holes are moved. During the procedure actually no pumping out of the liquid from the bottom layers is performed or only very slow withdrawal of liquid appears, which ensures the simultaneous return flow or post-flow of the liquid of the same quantity. Thereby an unexpected advantage is provided in that, in the bore hole which is under the underpressure first the mixing of oil and water or rinsing liquid occurs so that oil can be withdrawn from the bore hole by means of a simple liquid feed pump.

The method has a further advantage in that, only the bore holes with a relatively small diameter are needed, and with the use of several and uniformly distributed bore holes when the individual bore holes can be provided with the underpressure alternatingly. Therefore the liquid currents in the ground region to be cleaned can be produced in different directions one after the other to increase the cleaning effect.

The bore holes can have different depths so that flows with vertical directional components can be formed. Advantageously, after a predetermined treatment time the bore holes are driven deeper together, so that the cleaning region is cleaned in horizontal layers. In each case the method has the important advantage in that, only the contaminated region is treated and displacement of contaminants into another not contaminated ground layers is avoided. Advantageously, the method can be performed intermittently. In the bore hole which is under the underpressure, a lowering of the liquid level is obtained by timely reduction of the underpressure, and the post-flow of residues and oil containing liquid fraction in the opening is facilitated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single figure of the drawings is a view showing an arrangement for performing a method of yielding oil residues or oil containing liquids from contaminated ground layers, in accordance with the present invention.

DESCRIPTION OF PREFERRED EMBODIMENTS

It can be seen from the drawings, three bore holes are formed in a ground region which is contaminated with oil.

They include a central bore hole 10 which is preferably provided with a pipe, and two additional bore holes 11 and 12 located at both sides of the central bore hole 10 and extending in a ground region 13 which is composed of several layers A-G and contaminated with oil. For this purpose three bore tubes 14, 15 and 16 can be utilized. They are screwed in or rammed in the ground and after withdrawal of the bore cores can be used for the method in accordance with the invention. The arrangement is provided for treating two or several ground layers, namely the ground layer C and F in which an especially strong oil contamination is determined. They are, for example, sediment layers composed predominantly from sand gravel.

When the three bore holes 10, 11, 12 are driven to the ground layer C, a partial rinsing of the ground layer is performed. For example, water under high pressure is pumped in the central bore tube 14, while simultaneously the pressurized water and the sand and gravel material loosened by it in the layer C are aspirated from other bore tubes 15 and 16. This process is not shown in the drawings. During this at least partial free rinsing of the channels extending within the individual bore holes in the ground layer C the pressurized water filling between the three bore tubes 13, 15, 16 can be performed in alternating manner.

After the connecting passages between the formed bore holes 10, 11, 12 have been formed and provide the flow of ground water or specially introduced rinsing liquid, the underpressure is produced in the central bore hole 10 by a fan 25. The air aspirated from the bore hole is identified by the arrow 17. Due to the underpressure generation a raise of the liquid level occurs in the interior of the bore holes and mixing of oil and the carrier liquid is performed at least substantially in the raising liquid. An oil lens 29 which flows on the carrier liquid is shown in the drawings. This oil can be pumped out from the bore hole 10 through a conduit 31 by an introduced feed pump 30. The rinsing or carrier liquid is identified by arrows 18 and 19 in the bore holes 11 and 12. This liquid, for example, water can be post-supplied to bore holes 11 and 12 into the ground region F and C. Both bore holes 11 and 12 can however serve as pure ventilation openings when in the bottom region C sufficient ground water is located, so that under the action of the underpressure in the central bore hole 10 movement can be produced. The underpressure in the bore hole 10 can be formed so intense that the liquid is pulled up in the tube 14 to a lateral flow opening 26. As shown in the drawings with dash-dot line, the opening 26 can be connected through an oil separator 27 and a connection conduit with the bore hole 11 or also with the bore hole 12. The carrier liquid which flows back in the bore hole 11 is identified with the arrow 28.

The pump 25 can be alternatingly arranged on bore tubes 15 and 16. Therefore these tubes can be placed under tremendous pressure and in these tubes the raise of the liquid level with a admixing of oil can occur.

When the ground layer C is cleaned, the bore tubes 14, 15, 16 are driven further into the next ground Layer to be cleaned and then at least connecting passages between the individual bore holes are provided again by rinsing. It is also possible to arrange the regions between the bore holes in the individual ground layers so as to form complete hollow spaces 20, 21, 22 and fill the hollow spaces with floating filling bodies, for example ceramic bodies 24, for protection against closing. Subsequently, all of the bore holes is again put under the underpressure and the oil residues available in the ground layer are again removed in the above-described manner.

It will be understood that each of the elements described above, or two or more together, may also find a useful application in other types of methods differing from the types described above.

While the invention has been illustrated and described as embodied in METHOD OF YIELDING OIL RESIDUES OR OIL CONTAINING LIQUIDS FROM CONTAMINATED GROUND LAYERS, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of yielding oil residues or oil containing liquids from contaminated ground layers, comprising the steps of forming at least two adjacent bore holes in a contaminated ground region; producing connecting passages between said bore holes by loosening and partially rinsing out components of a ground material which surrounds said bore holes by directing a liquid in any of said bore holes; applying an underpressure in at least one of said bore holes for aspirating a liquid column upwardly in said at least one bore hole; supplying a fluid in at least another of said bore holes with maintaining a pressure difference between said bore holes; and in said at least one bore hole which is under underpressure, aspirating oil which is separated from the liquid column inside said one bore hole or an oil containing cover layer of the liquid column.

2. A method as defined in claim 1, wherein said loosening and with partial rinsing out includes pumping the liquid in said at least one bore hole.

3. A method as defined in claim 1, wherein said loosening and with partial rinsing out includes aspirating the liquid from said at least one bore hole.

4. A method as defined in claim 1, wherein said supplying a fluid includes supplying the liquid in said at least another bore hole.

5. A method as defined in claim 1, wherein said supplying a fluid includes supplying air in said at least another bore hole.

6. A method as defined in claim 1, wherein said aspirating includes aspirating by a liquid feed pump.

7. A method as defined in claim 1, wherein said providing includes providing several such bore holes arranged approximately at uniform distances from one another and alternatingly providing the underpressure in said at least one bore hole and providing a pressure in said at least another bore hole while maintaining a pressure difference, for supplying the fluid in said at least another bore hole.

8. A method as defined in claim 1, and further comprising driving said bore holes further down after a predetermined treatment time and again repeating said steps of producing connecting channels, providing the underpressure, supplying the fluid, and aspirating the oil or oil containing cover layer.

9. A method as defined in claim 1, and further method, comprising intermittently performing the steps of producing the underpressure and therefore aspirating the liquid upwardly, and aspirating the oil or the oil containing cover layer.

10. A method as defined in claim 1, wherein said step of providing the underpressure includes slowly aspirating the liquid from said at least one bore hole which is under the underpressure up to a discharge opening provided with an oil separator.

* * * * *